United States Patent [19]

Yamaguchi

[11] Patent Number: 5,668,637
[45] Date of Patent: Sep. 16, 1997

[54] IMAGE PROCESSING APPARATUS HAVING A COPY FUNCTION

[75] Inventor: Shoichi Yamaguchi, Yokohama, Japan

[73] Assignee: Canon Kabushiki Kaisha, Tokyo, Japan

[21] Appl. No.: 619,437

[22] Filed: Mar. 21, 1996

[30] Foreign Application Priority Data

Mar. 22, 1995 [JP] Japan .................................. 7-088860
Mar. 6, 1996 [JP] Japan .................................. 8-078383

[51] Int. Cl.$^6$ ........................................................ H04N 1/04
[52] U.S. Cl. ................................................ 358/296; 358/486
[58] Field of Search ................................. 358/296, 404, 358/412, 444, 486

[56] References Cited

U.S. PATENT DOCUMENTS

| | | | |
|---|---|---|---|
| 4,521,813 | 6/1985 | Yoshida et al. .................... | 358/296 |
| 4,864,416 | 9/1989 | Ishikawa ............................ | 358/486 |
| 5,163,123 | 11/1992 | Kadono .............................. | 395/116 |
| 5,317,416 | 5/1994 | Tsuboi et al. ...................... | 358/444 |
| 5,572,335 | 11/1996 | Stevens ............................... | 358/442 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

In an image processing apparatus, when a copying operation is to be conducted with a scanner and a printer having different read speed and record speed, a read document sheet feed unit having two document sheet feed speeds, one synchronized with a read interval of the image sensor and the other synchronous with a print interval of the pointer, a signal generation unit for generating a read suppress signal at a predetermined time interval and a read suppress unit for suppressing the reading of the image sensor in accordance with the read suppress signal are provided. Thus, an the copy mode, the read document sheet is fed at a speed equal to the printer speed and the image read by the image sensor is thinned so that the copy operation is attained without deterioration of image quality with a small capacity of buffer memory and simple control.

11 Claims, 8 Drawing Sheets

FIG. 4A — CLOCK 201 — CHART 41
FIG. 4B — CARRY 206 — CHART 42
FIG. 4C — SENSOR DRIVING PULSE — CHART 43
FIG. 4D — MOTOR DRIVING PULSE a — CHART 44
FIG. 4E — MOTOR DRIVING PULSE b — CHART 45
FIG. 4F — MOTOR DRIVING PULSE c — CHART 46

FIG. 5A  CLOCK 201  CHART 51
FIG. 5B  CARRY 206  CHART 52
FIG. 5C  CARRY 207  CHART 53
FIG. 5D  SENSOR DRIVING PULSE  CHART 54
FIG. 5E  MOTOR DRIVING PULSE  CHART 55
FIG. 5F  PRINTER BD  CHART 56
FIG. 5G  INPUT POINTER  CHART 57
FIG. 5H  OUTPUT POINTER  CHART 58

IMAGE PROCESSING APPARATUS HAVING A COPY FUNCTION

BACKGROUND OF THE INVENTION

1. Field of the Invention

The present invention relates to an image processing apparatus having a copy function.

2. Related Background Art

As an apparatus of this type, a facsimile apparatus is known. The facsimile apparatus usually has a copy function to read a document sheet and record an image of the read document sheet. The read process of the document sheet in the facsimile apparatus is conducted by reading the image of the document sheet line by line by a linear image sensor of a scanner and reading the entire image of the document sheet by moving the document sheet or the image sensor. The image sensor converts darkness/thickness of the document sheet to an electrical signal in accordance with a reflected light from the document sheet. In this case, an inherent accumulation time (1 ms) to accumulate the reflected light is needed and the line reading is conducted by the unit of the accumulation time. The document sheet (or the image scanner) is moved in synchronism with the accumulation time.

On the other hand, a recording speed of a printer needs 1.25 ms per line of recording even with a high speed printer such as a laser beam printer, which is slower than the read speed (1 ms) per line described above.

Thus, the image signal read by the scanner of the facsimile apparatus is stored in a buffer memory and outputted from the buffer memory to the printer. When the buffer memory has a capacity to store the image data of one page of document sheet, one page of image data is stored in the page buffer while the document sheet is constantly fed at the read speed of the scanner and the image data is read from the page buffer at the recording speed of the printer for recording. In this case, since the document sheet is fed and read at the constant speed, the deterioration of the image does not take place.

However, when the capacity of the buffer memory is smaller than one page and has only several lines of capacity, since the read speed is faster than the recording speed, it is necessary to stop the record operation when the buffer memory becomes full and resume the read operation when a vacant area is produced in the buffer memory. As a result, the feed of the document sheet is intermittently conducted, and when a simple intermittent drive control is conducted, the line read is ununiform and the image is deteriorated. In order to prevent the deterioration of the image in the intermittent drive mode, a complex control is required to compensate for the ununiformity of the document sheet feed in the intermittent drive mode.

SUMMARY OF THE INVENTION

In the light of the above, it is an object of the present invention to provide an improved image processing apparatus having the copy function.

It is another object of the present invention to attain a copy operation which reads an image line by line, records the image line by line, and which, when the read speed per line is faster than the recording speed and a buffer memory having a smaller memory capacity than one page of capacity is used, does not need a complex control and does not cause the deterioration of the image.

Other objects of the present invention will be apparent from the following detailed description of the embodiments and the accompanying drawings.

DETAILED DESCRIPTION OF THE PREFERRED EMBODIMENTS

An embodiment of the present invention is now described in detail with reference to the drawings.

In the following embodiment, a facsimile apparatus is described as an image processing apparatus.

Figure 1:
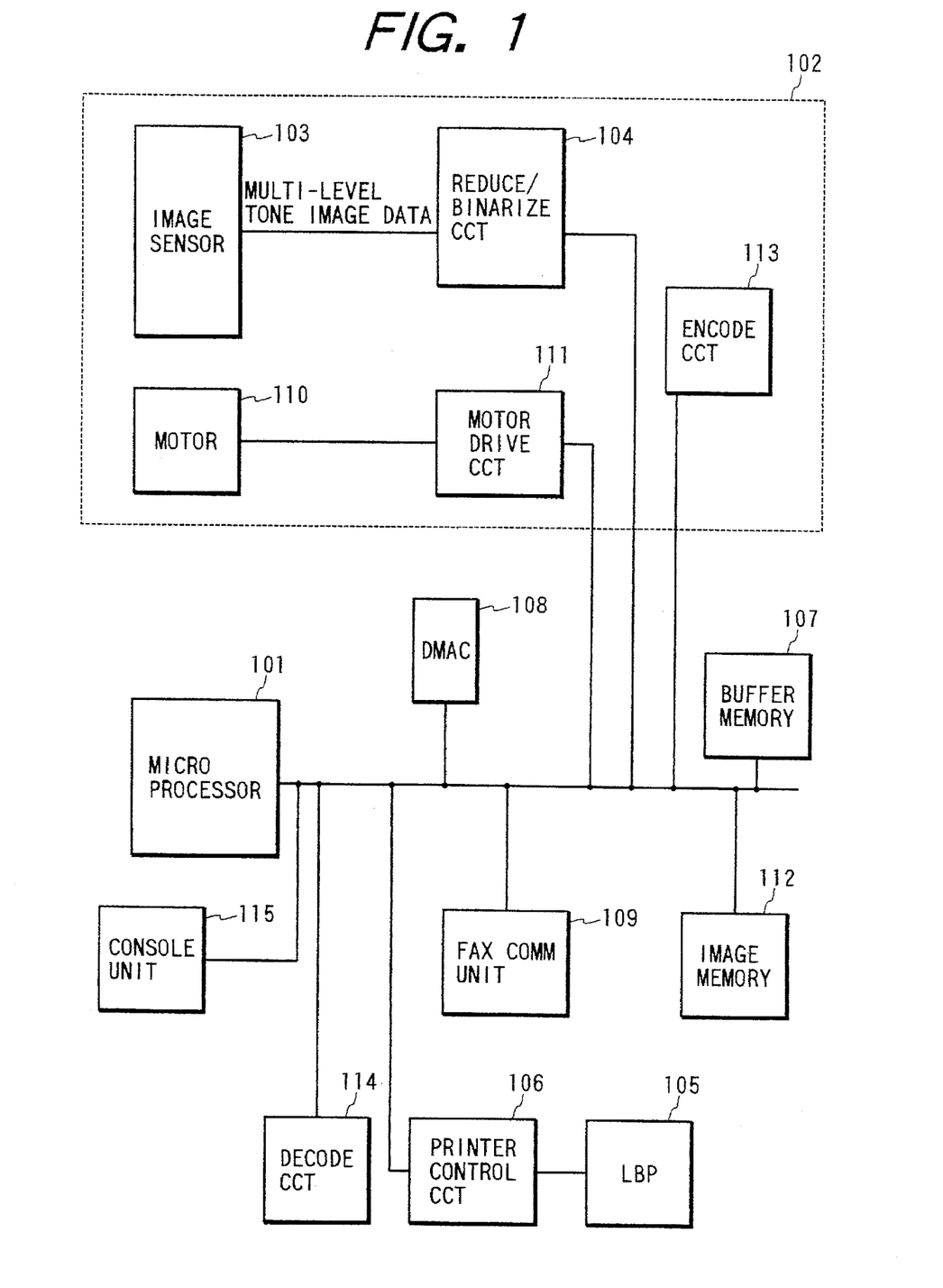
FIG. 1 shows a block diagram of a configuration of a facsimile apparatus of an embodiment of the present invention.

FIG. 1 shows a block diagram of a configuration of a facsimile apparatus of one embodiment.

In FIG. 1, numeral 101 denotes a microprocessor which builds a program for controlling the entire system therein, numeral 110 denotes a stepping motor for feeding a document sheet to be read, numeral 111 denotes a drive circuit for the motor 110 and numeral 102 denotes a document sheet read station for reading the document sheet. As the stepping motor 110 is rotated one step, the document sheet is fed by 1/15.4 mm. Numeral 103 denotes a contact type image sensor which outputs a 6-bit multi-tone image data having the number of pixels per line of 3456 dots (for a size A4, letter or legal), a read resolution (along a line) of 16 dots/mm and an accumulation time of 1 ms, numeral 104 denotes a thinning(reducing)/binarization circuit for thinning and binarizing the multi-tone image data in accordance with a command from the microprocessor 101, numeral 105 denotes a laser beam printer having a main scan (line direction) recording density of 16 dots/mm, a sub-scan recording density (line density) of 15.4 dots/mm and a recording speed per line of 1.25 ms, numeral 106 denotes a control circuit for the printer 105, numeral 107 denotes a buffer memory capable of holding ten lines of image data, numeral 112 denotes an image memory used as a page buffer for received data, transmitting data and memory copy mode, numeral 108 denotes a DMA controller for transferring the image data from a coding circuit 113 to the buffer memory 107 or the image memory 112 and transferring image data from the buffer memory 107 to the printer control circuit 105, and numeral 109 denotes a facsimile communication unit for conducting data compression, decompression and communication control.

Figure 2A:
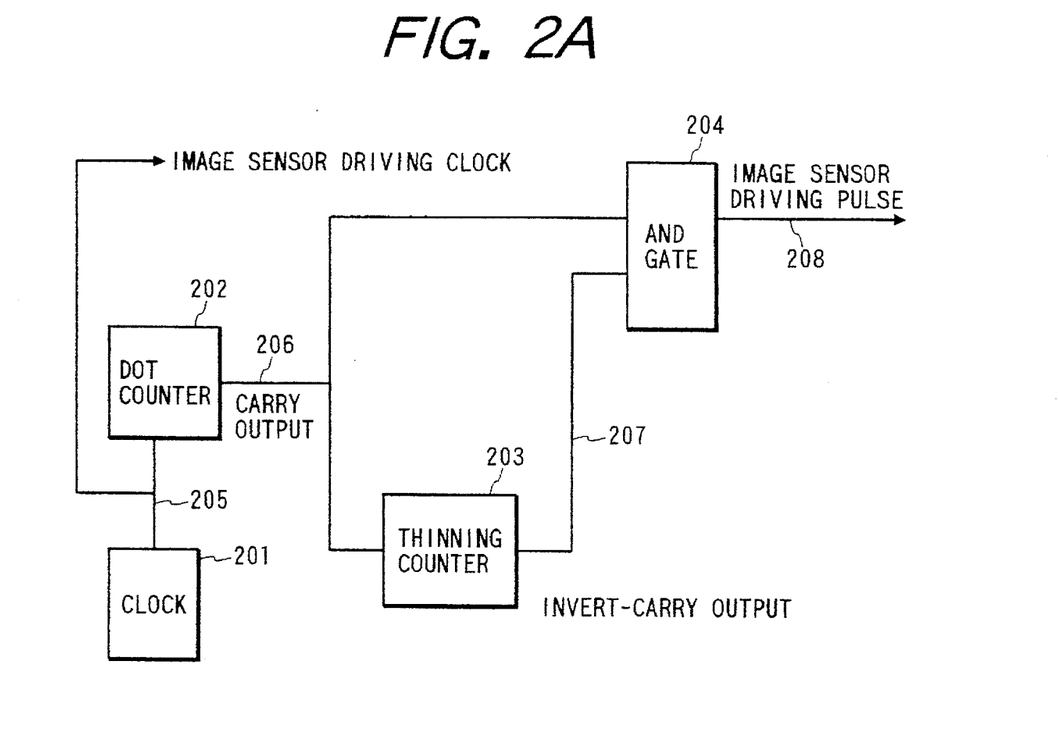
FIGS. 2A and 2B show a block diagram of a detailed configuration of a thinning/binarization circuit 104.
Figure 2B:
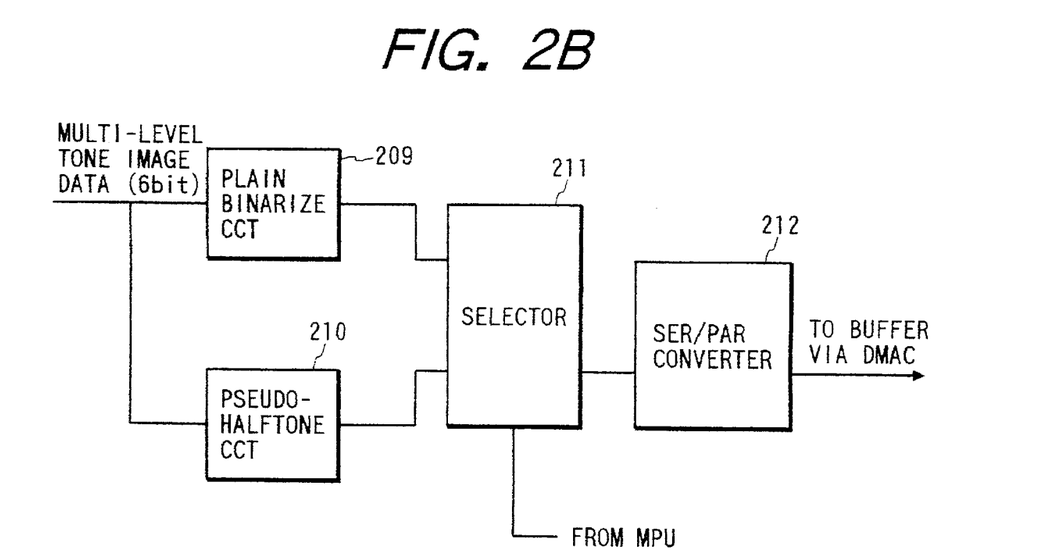

FIGS. 2A and 2B show a block diagram of a configuration of the thinning/binarization circuit 104.

A section shown in FIG. 2A is a thinning (or reducing) circuit which comprises a pixel clock generation unit 201 for generating a pixel clock, a dot counter 202 for outputting a carry output 206 each time clocks corresponding in number to the number of pixels included in one line are counted, a thinning counter 203 for outputting an inversion output 207 each time the carry output 206 is counted by five times, and an AND gate 204 for logically ANDing the carry output 206 and the inversion output 207 to output an image sensor drive pulse 208.

A section shown in FIG. 2B is a binarization circuit which comprises a plain binarization circuit 209 for slicing the multi-tone data at a constant slice level to binarize it, a pseudo-halftone circuit 210 for binarizing data while maintaining the tonality by such as a dither process or an error diffusion process, a selector 211 for selecting an output of the plain binarization circuit 209 or the pseudo-halftone circuit 210 in accordance with an indication from the microprocessor 101, and a serial/parallel conversion circuit 212 for converting the serial data outputted from the selector 211 to parallel data.

Figures 3A, 3B:
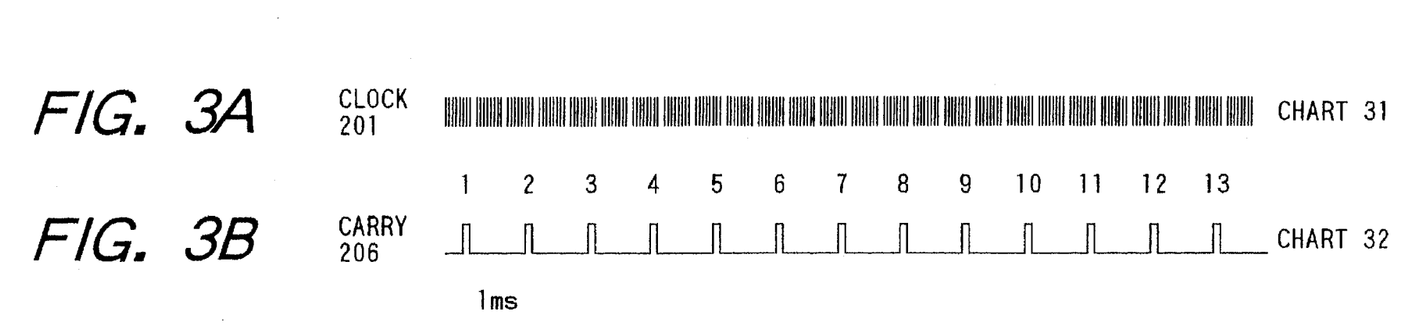
FIGS. 3A to 3D show a timing chart for a memory copy mode.
Figure 3C:
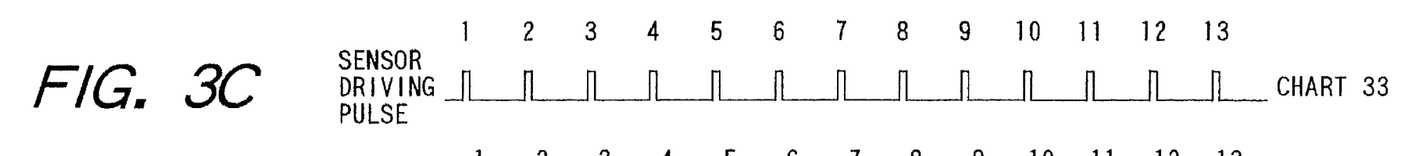
Figure 3D:
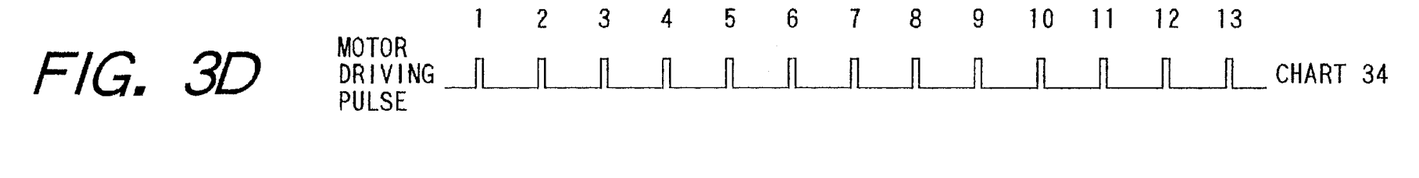

A memory copy operation in the present embodiment (in which the image data of the read document sheet is stored in the image memory having a multi-page capacity and the image data of the document sheet is read from the image memory and recorded by the printer 105) is now described. FIGS. 3A to 3C show a timing chart for the memory copy mode.

The motor drive circuit 111 supplies drive pulses to the document sheet feed motor 110 so that the motor is rotated in synchronism with the accumulation time of 1 ms of the image sensor 103. The clock 201 is the pixel clock and a period thereof is equal to a quotient of the accumulation time of 1 ms of the image sensor divided by the number of pixels per line of 3456, that is;

1000 µs/3456=0.289 µs (Chart 31)

A dot counter 202 outputs a carry output 206 each time it counts the clock by the number equal to the number of pixels. Namely, the carry output 206 is produced at every 1 ms (Chart 32). An image sensor drive pulse 208 is the carry output 206 having the period of 1 ms. The image sensor 103 responses to the drive pulse 208 to output one line of 64-tone multitone image data to the thinning/binarization circuit 104.

In the thinning/binarization circuit 104, the pixels having tonalities are converted to 0 or 1, or black or white by the plain binarization circuit 209 and the pseudo-halftone circuit 210. Any conversion process may be used, but in the present embodiment, the plain binarization circuit binarizes the input pixel having the tone level between 30 and 63 to the black (0) and the input pixel having the tone level between 0 and 29 to the white (0). The pseudo-halftone circuit binarizes by the error diffusion method.

The binarized data is supplied to the serial-parallel conversion circuit 212 through the selection of one of the plain binarized output and the pseudo-halftone output by the data selector 211 in accordance with the indication from the microprocessor 101. The data is coded by the coding circuit 113 and one page of data is transferred to the image memory 112 by the DMAC 108. When the thinning and dethinning processes are required, they are conducted for the one page of data in the image memory.

In the printer, the one page of image data is decoded by the decode circuit 114 and transferred by the DMAC 108 from the memory 112 to the printer control circuit 106 in synchronism with the line synchronization signal (usually referred to as a BD signal) sent from the laser beam printer 105. In the printer control circuit 106, the parallel data from the DMAC is converted to the serial data and outputted to the printer in synchronism with the pixel clock of the printer. The above print operation is repeated by a specified number of sheets.

In the above memory copy mode, the document sheet is fed at a constant speed in the scanner 102 by the motor driven in synchronism with the one line of accumulation time (1 ms) of the image sensor.

The memory send operation (in which the read image data of the document sheet is stored in the image memory and then it is sent) is now described. FIGS. 4A to 4F show a timing chart in the memory send mode.

Figure 4A:
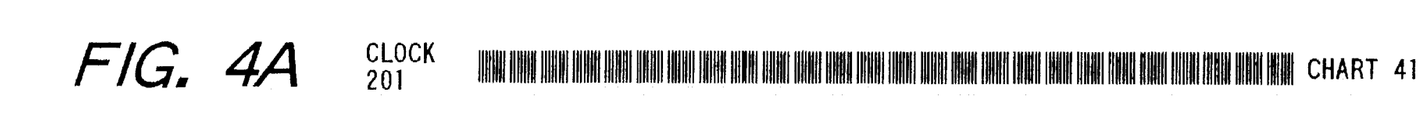
FIGS. 4A to 4F show a timing chart for a memory send mode.
Figure 4B:
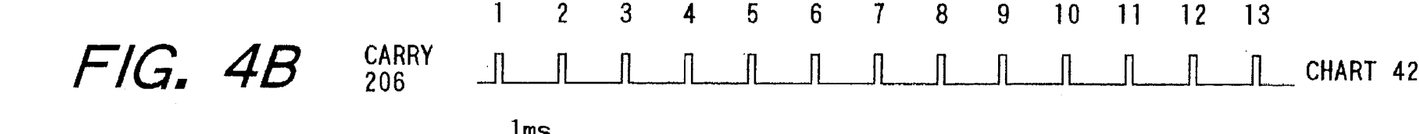
Figure 4C:
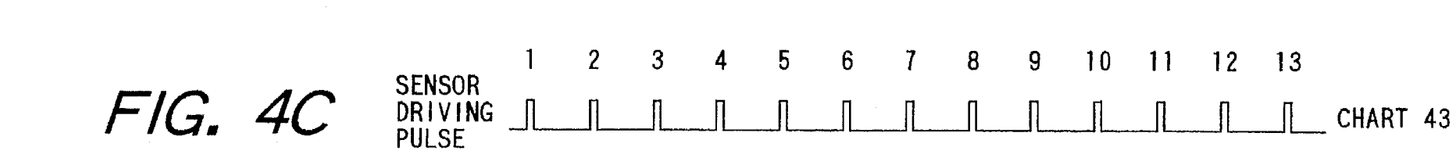
Figure 4D:
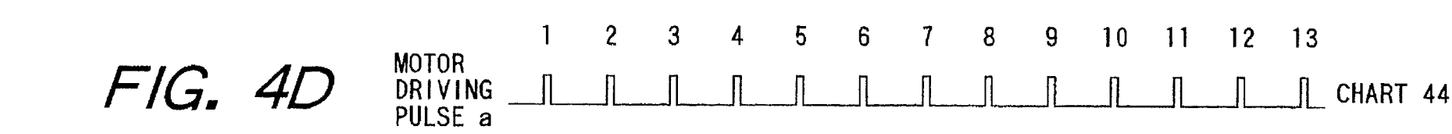
Figure 4E:
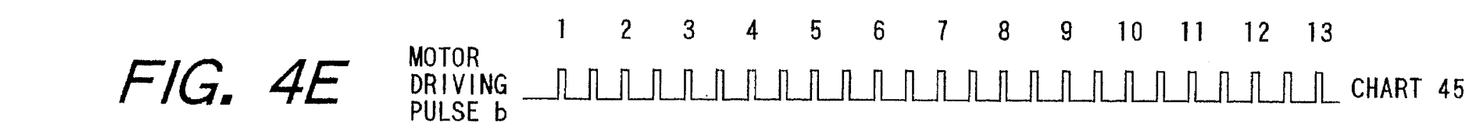
Figure 4F:
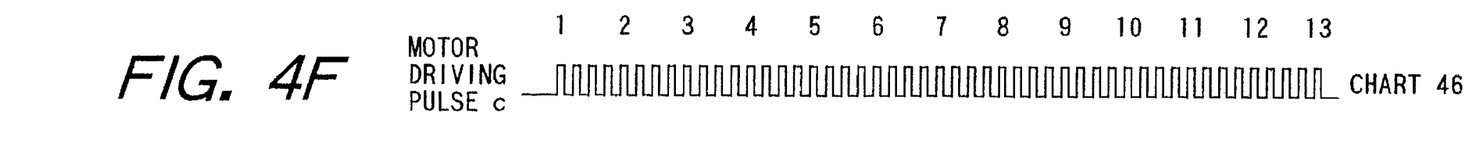

The sub-scan resolution in the send mode may include 7.7 dots/mm and 3.85 dots/mm as well as 15.4 dots/mm as it is in the normal copy mode. The sub-scan resolution is selected by the key operation through a console unit 115. The motor drive circuit 111 supplies the drive pulses to the document sheet feed motor 110 at a different timing depending on one of the three resolutions. For 15.4 dots/mm, the drive pulse is supplied to the document sheet feed motor 110 so that the motor is rotated in synchronism with the accumulation time of 1 ms of the image sensor 103 as shown in Chart 44, as it is for the memory copy mode. For 7.7 dots/mm the drive pulse is supplied to the document sheet feed motor 111 at a rate of one pulse per 0.5 ms so that the motor is rotated by two steps while the image sensor 103 reads one line of data as shown in Chart 45. For 3.85 dots/mm, the drive pulse is supplied to the document sheet feed motor 110 at a rate of one pulse per 0.25 ms so that the motor is rotated by four steps while the image sensor 103 reads one line of data as shown in Chart 46.

The clock 201 is the pixel clock and the period thereof is equal to a quotient of the accumulation time of the image sensor of 1 ms divided by the number of pixels per line of 3456, that is;

1000 µs/3456=0.289 µs (Chart 41)

The dot counter 202 outputs a carry output 206 each time it counts the clocks by the number equal to the number of pixels. Namely, the carry output 206 is outputted at every 1 ms (Chart 42). The image sensor drive pulse 208 is the carry output 206 having the period of 1 ms. The image sensor 103 responses to the drive pulse 208 to output a tone line of 64-tone multitone image data to the thinning/binarization circuit 104. In the thinning/binarization circuit 104, the pixels having the tones are converted to 0 or 1, or black or white by the plain binarization circuit 209 or the pseudo-halftone circuit 210. Any conversion system may be used but in the present embodiment, the plain binarization circuit binarizes the input pixels having tone levels between 30 and 64 to the black (1) and the pixels of lower tone levels to the white (0). The pseudo-halftone circuit binarizes by the error diffusion method.

The binarized image is supplied to the serial-parallel conversion circuit 212 through the selection of the plain binarized output or the pseudo-halftone output by the data selector in accordance with the indication from the microprocessor 101. The data is coded by the coding circuit 113 and transferred to the image memory 112 by the DMAC 108. The coded image is transferred to the facsimile communication unit 109 and outputted to a line.

In the above memory send mode, the document sheet is fed at a constant speed in synchronism with the accumulation time (1 ms) of the image sensor as it is in the memory copy mode of FIGS. 3A to 3D, but the feed speed varies with the sub-scan resolution.

In the facsimile apparatus of the present embodiment, when the document sheet is to be copied, if a buffer area of at least one page size of the image memory 112 is available, the same read process as that of FIGS. 3A to 3D described above is conducted. However, if the buffer area is not available (the page buffer area of the image memory is busy), the copy operation (synchronous copy operation) is conducted by using the line memory 107 having several lines of capacity. For a simple copy of one page, the synchronous copy using the buffer memory 107 may be conducted. The synchronous copy operation is described below. FIGS. 5A to 5H show a time chart for the synchronous copy operation.

Figure 5A:
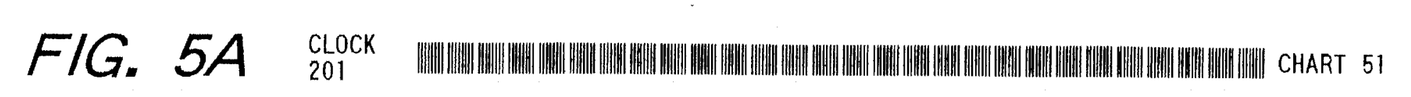
FIGS. 5A to 5H show a timing chart for a synchronous copy mode.
Figure 5B:
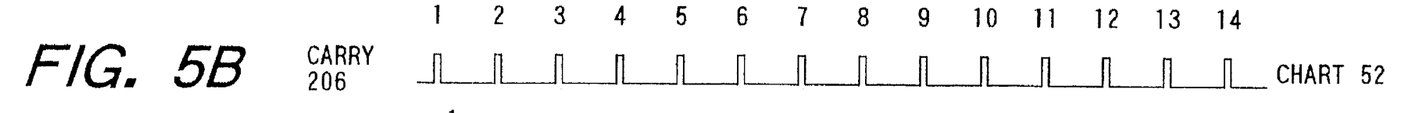
Figure 5C:
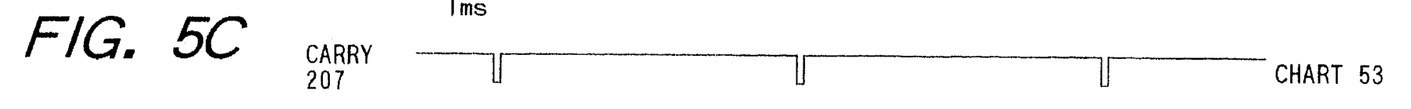
Figure 5D:
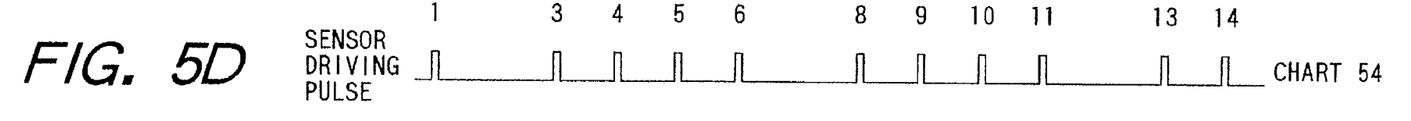
Figure 5E:
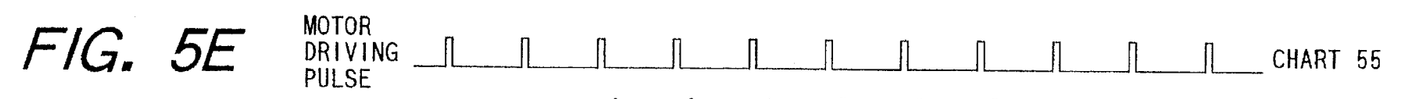

The drive pulse is supplied from the motor drive circuit 111 to the document sheet feed motor 110 such that the motor is normally rotated in synchronism with the accumulation time of 1 ms of the image sensor 103, but for the copy operation, the drive pulse is supplied from the motor drive circuit 111 such that the motor is rotated in synchronism with the print speed of 1.25 ms/line of the printer 105 (Chart 55). The clock 201 is the pixel clock and the period thereof is equal to a quotient of the accumulation time of 1 ms of the image sensor divided by the number of pixels per line of 3456, that is;

1000 μs/3456=0.289 μs (Chart 51)

The dot counter 202 outputs a carry output 206 each time it counts the clock by the number equal to the number of pixels. Namely, the carry output 206 is outputted at every 1 ms (Chart 52).

The thinning counter 203 receives the carry output 206 as a count clock and outputs the carry output 207 which is inverted at every fifth count (Chart 53). The AND gate 204 logically ANDs the carry output 206 and the inverted carry output 207 to generate the image Sensor drive pulse 208 (Chart 54). The image sensor drive pulse 208 has a waveform in which the carry output 206 of the period of 1 ms is eliminated at every fifth output. As seen from FIGS. 5A to 5H, an average period is 1.25 ms which is equal to that of the motor drive pulse. The image sensor 103 responses to the drive pulse 208 to output one line of 64-tone multitone image data to the thinning/binarization circuit 104.

In the thinning/binarization circuit 104, the pixels having tones are converted to 0 or 1, or black or white by the plain binarization circuit 209 and the pseudo-halftone circuit 210. Any conversion system may be used, but in the present embodiment, the plain binarization circuit binarizes the input pixels having the pixel levels between 30 and 64 to the black (1) and binarizes the pixels of lower levels to the white (0). The pseudo-halftone circuit binarizes by the error diffusion method.

Figure 5F:
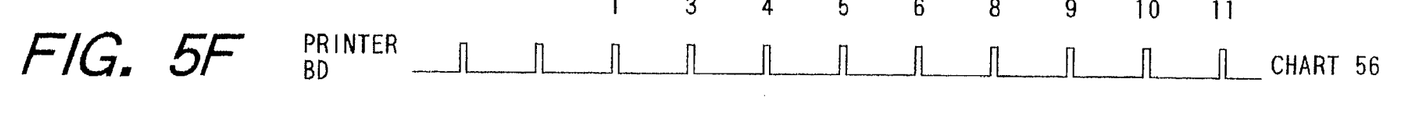
Figure 5G:
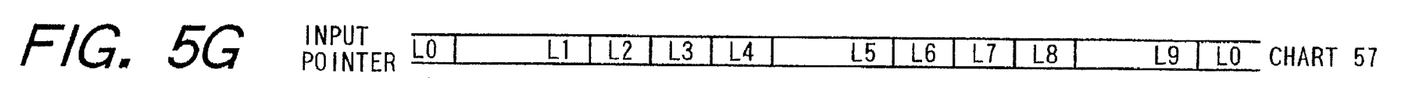

The binarized data is supplied to the serial-parallel conversion circuit 212 through the selection of the plain binarized output or the pseudo-half-level output by the data selector 211 in accordance with the indication from the microprocessor 101. The data is transferred to the area of the buffer memory 107 pointed to by the input pointer (Chart 57).

Figure 5H:
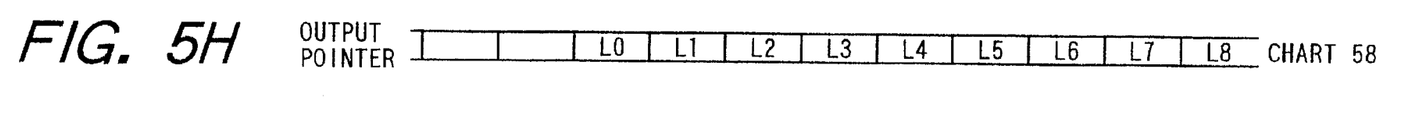

On the other hand, in the printer, the data is transferred from the pointer of the buffer memory 107 pointed to by the output pointer to the printer control circuit 106 by the DMAC 108 in synchronism with the line synchronization signal (normally referred to as a BD signal) sent from the laser beam printer 105 (Charts 56, 58). The printer control circuit 106 converts the parallel data from the DMAC to serial data and outputs it to the printer in synchronism with the pixel clock of the printer.

The above read and print operations are simultaneously conducted at a constant timing to be described later so that the document sheet may be fed at the constant speed even with a small capacity of buffer memory and the recording at the unity magnification is attained by the printer.

Figure 7:
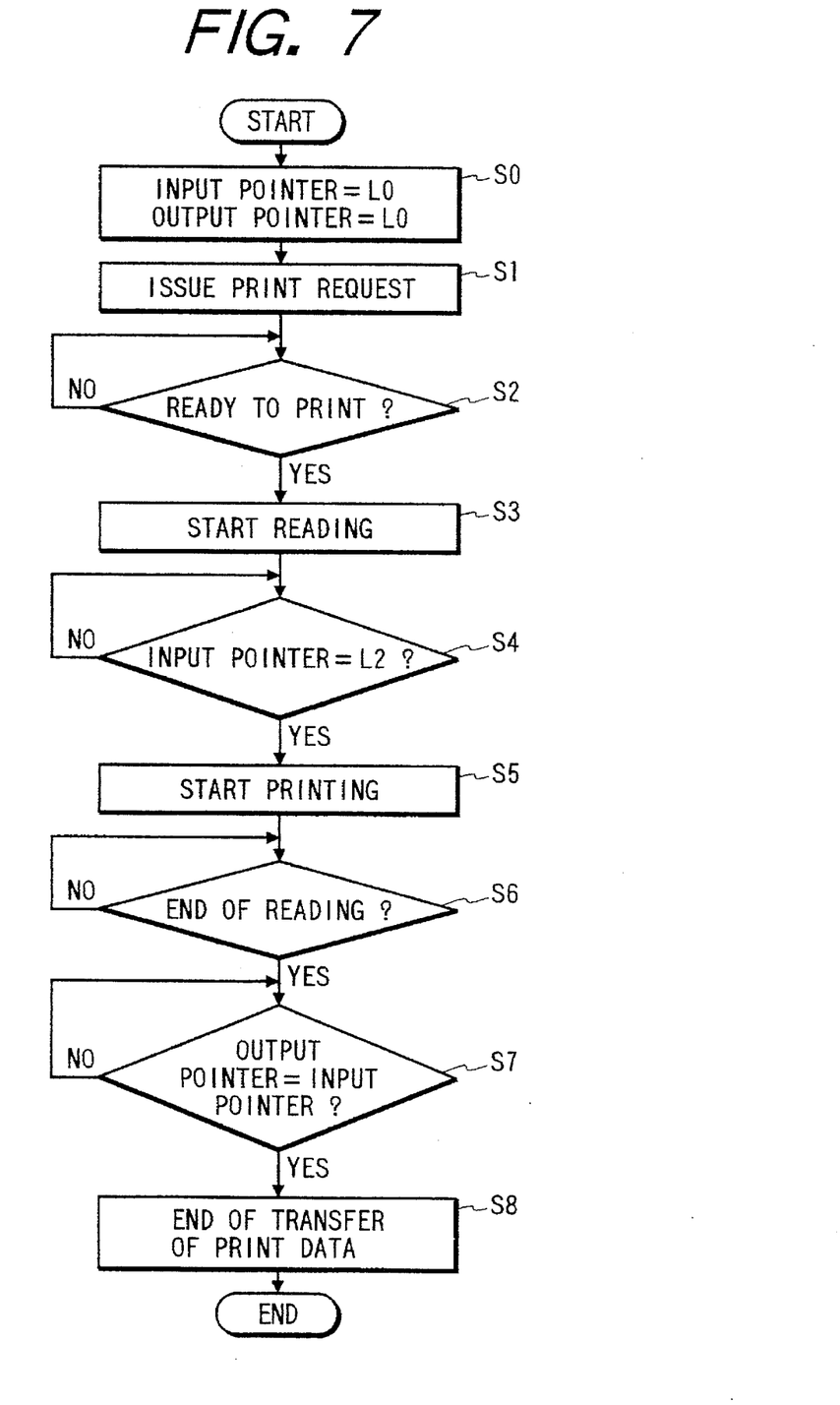
FIG. 7 shows a flow chart of a data transfer control for the synchronous copy mode.

The data transfer control through the buffer memory by the microprocessor 101 in the synchronous copy mode is now described. FIG. 7 shows a flow chart of the data transfer control by the microprocessor 101.

First, for the DMAC 108, the initial value L0 of the input pointer and the output pointer pointing to the memory areas for inputting and outputting the image data are set (S0). Then, a print request is issued to the laser beam printer 105 (S1).

Then, the print ready state of the laser beam printer 105 is monitored, and when the print ready state is detected, the read operation described above is initiated (S2, S3).

Figure 6:
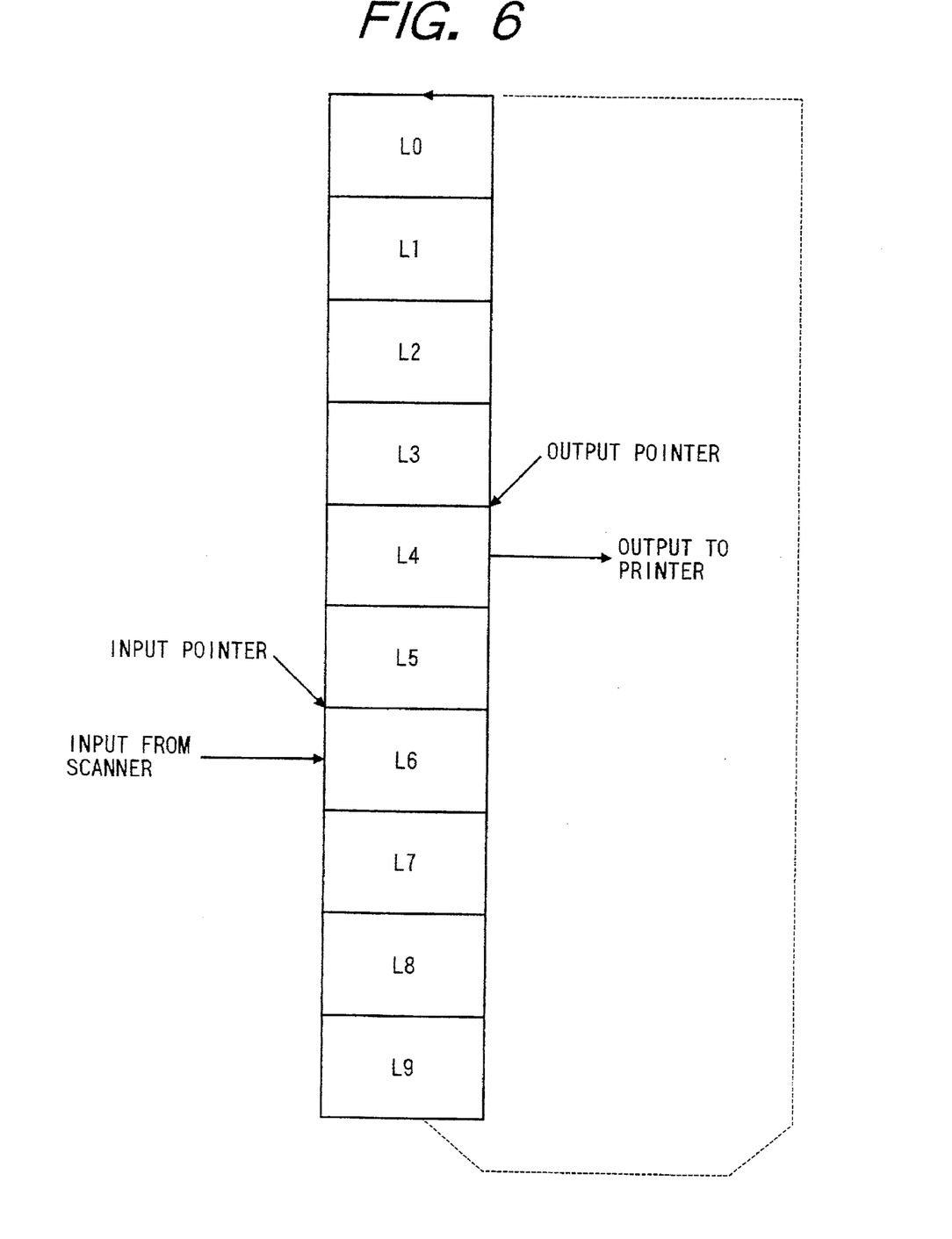
FIG. 6 shows a line area of a buffer memory 107.

The read image data is transferred to the lines L0, L1, . . . . of the line buffer memory 107 shown in FIG. 6 and when the input pointer reaches L2, the print start command is issued to the pointer 105 (S4, S5).

Thus, the DMAC 108 starts to transfer the data sequentially from the line L0 of the line buffer memory 107 to the printer 105. The memory 107 is managed in a ring as shown in FIG. 6 and average periods of changes of the input pointer and the output pointer are equal as shown in FIGS. 5G and 5H. Thus, the catch-up of the output pointer to the input pointer never takes place.

In this manner, the image is printed in synchronism with the reading of the document sheet.

When the completion of the reading of the document image is detected, the DMAC of the read station is stopped and the current input pointer content is read. Then, when the output pointer reaches the input pointer, the DMAC in the printer is stopped to terminate the printing.

Figure 8:
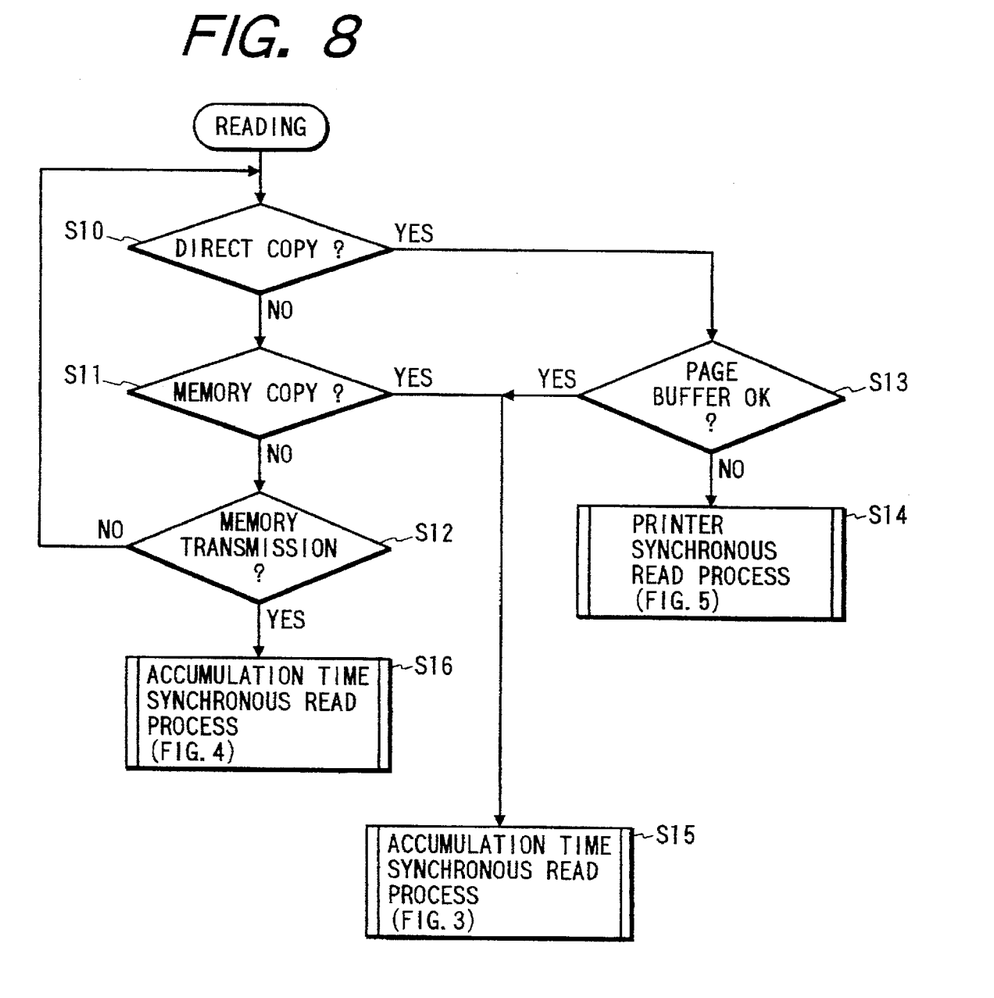
FIG. 8 shows a flow chart of a mode selection process of the embodiment.

FIG. 8 shows a flow chart of a process to select the memory copy, memory send or synchronous copy mode by the microprocessor 101.

When the read operation is to be conducted, the microprocessor 101 checks which one of the direct copy mode, the memory copy mode and the memory send mode has been selected in S10, S11 and S12. If the direct copy mode has been selected, whether the page buffer area of the image memory 112 is available or not is determined in S13. If the page buffer area of the image memory 112 is not available, the buffer memory 107 is used in S14 and the synchronous copy mode of operation described with reference to FIGS. 5A to 7 is conducted. When one-sheet copy is selected, the synchronous copy mode may be selected whether the page buffer area is available or not.

When the memory copy mode is selected or when the direct copy mode is selected and the page buffer area is not available, the memory copy mode of operation described with reference to FIGS. 3A to 3D is executed in S15.

When the memory send mode is selected, the memory send mode of operation described with reference to FIGS. 4A to 4F is conducted in S16.

In accordance with the present embodiment, in the facsimile apparatus having the scanner and the printer of different speeds, the copy operation may be conducted without stopping the scanner so that the control is facilitated and the impact to the image by the drive unit due to the stop and restart is avoided and the deterioration of the image quality is prevented.

Further, since the reading and the recording are conducted essentially simultaneously, the memory capacity required may be suppressed to a minimum and economy is attained.

For a halftone image, since the thinning process is conducted by the pseudo-halftone circuit prior to the binarization process, no substantial deterioration of the image quality by the thinning process takes place.

In the present embodiment, by using a thinning circuit which can finely set a thinning ratio in place of the thinning counter 203, a larger degree of freedom is attained for the speed relation between the scanner 102 and the printer 105.

In accordance with the present embodiment, when the page buffer area of the image memory 112 is not available, the copy operation with minimum deterioration of the image quality and the easy control is attained by using the buffer memory 107 of a small capacity.

The present invention is not limited to the above embodiment but various modifications thereof may be made.

What is claimed is:

1. An image processing apparatus comprising:
    read means for reading a document sheet line by line with a first time interval between lines;
    record means for recording image data line by line with a second time interval longer than the first time interval between lines;
    feed means for relatively moving said document sheet and said read means;
    a buffer memory for temporarily storing the image data from said read means and outputting the stored image data to said record means;
    drive means for driving said feed means in synchronism with the second time interval to relatively move said document sheet and said read means at a first constant speed; and
    conversion means for converting the image data outputted from said read means at the first time interval to the image data of the second time interval.

2. An image processing apparatus according to claim 1 wherein said buffer memory is a ring buffer memory having at least two lines of memory capacity and managing data cyclically.

3. An image processing apparatus according to claim 1 wherein said conversion means includes thinning means for periodically thinning the line data and converts the image data of the first time interval to the image data of the second time interval by periodically thinning the image data of the first time interval.

4. An image processing apparatus according to claim 3 wherein said conversion means stores the thinned image data in said buffer memory and reads the image data form said buffer memory at the second time interval to convert the image data of the first time interval to the image data of the second time interval.

5. An image processing apparatus according to claim 1 further including means for driving said feed means in synchronism with the first time interval to relatively move said document sheet and said read means at a second constant speed.

6. An image processing apparatus according to claim 5 further comprising means for selecting the drive speed of said feed means to said first speed or said second speed.

7. An image processing apparatus according to claim 6 further comprising a page buffer memory having at least one page of memory capacity, wherein when the image data from said read means is to be stored in said page buffer memory, said selection means selects said second speed.

8. An image processing apparatus comprising:
    an image sensor for reading a document sheet image line by line at a first constant time interval;
    a printer for printing the lines at a second constant time interval longer than the first time interval;
    document sheet feed means for feeding the document sheet at least at the first time interval of said image sensor or at the second time interval of said printer;
    a ring buffer memory having at least two lines of memory capacity and managing data cyclically;
    signal generation means for generating a read suppress signal at a predetermined time interval;
    read suppress means for suppressing the reading of said image sensor in accordance with said read suppress signal;
    read data transfer means for transferring the data read by said image sensor to said ring buffer memory;
    print data transfer means for reading the data held in said ring buffer memory and transferring the data to said printer; and
    synchronization means for synchronizing the start of said image sensor and the start of said printer.

9. An image processing apparatus according to claim 8 further comprising:
    a page buffer memory having at least one page of memory capacity; and
    means for synchronizing the feed by said feed means with the first time interval of said image sensor and inhibiting the issuance of the suppress signal when the image data from said image sensor is to be stored in said page buffer memory, and synchronizing the feed by said feed means with the second time interval of said printer and issuing the suppress signal at a constant interval when the image data from said image sensor is to be stored in said ring buffer.

10. An image processing apparatus according to claim 9 further comprising:
    specify means for specifying a line density; and
    change means for changing the feed speed of said feed means in accordance with a line density specified by said specify means.

11. An image processing apparatus according to claim 7 further comprising:
    specify means for specifying a line density; and
    change means for changing the feed speed of said feed means in accordance with a line density specified by said specify means.

* * * * *

UNITED STATES PATENT AND TRADEMARK OFFICE
CERTIFICATE OF CORRECTION

PATENT NO. : 5,668,637
DATED : September 16, 1997
INVENTOR(S) : SHOICHI YAMAGUCHI It is certified that error appears in the above-identified patent and that said Letters Patent is hereby corrected as shown below:

ON THE TITLE PAGE AT [57] ABSTRACT

Line 10, "an" should read --in--.

COLUMN 1

Line 10, "known," should read --known.--.

COLUMN 3

Line 47, "black (0)" should read --black (1)--.

COLUMN 5

Line 32, "Sensor" should read --sensor--.

Signed and Sealed this

Seventeenth Day of March, 1998

Attest:

BRUCE LEHMAN

Attesting Officer     Commissioner of Patents and Trademarks